Aug. 23, 1949.    A. ARUTUNOFF    2,479,711
CARTRIDGE TYPE SEAL FOR ROTATING SHAFTS
Filed Nov. 8, 1945

INVENTOR.
Armais Arutunoff
BY
ATTORNEY.

Patented Aug. 23, 1949

2,479,711

UNITED STATES PATENT OFFICE 2,479,711

CARTRIDGE TYPE SEAL FOR ROTATING SHAFTS

Armais Arutunoff, Bartlesville, Okla.

Application November 8, 1945, Serial No. 627,401

5 Claims. (Cl. 288—3)

This invention relates to improvements in seals for rotating shafts and refers more particularly to a sealing mechanism which may be mounted on a shaft at any desired location for sealing the rotating shaft against movement of fluids under pressure axially along the periphery or outer surface of the shaft.

The sealing of rotating shafts is normally accomplished either by a relatively soft packing material, such as leather, felt, asbestos, lead, wool, rubber or rubber-like compositions, which embrace the shaft and are held against the rotating outer surface of the shaft by pressure mechanically imposed. Usually the sealing surface comprises an accurately machined part or shoulder on the shaft which runs against the stationary part of the seal, the close contact between the sealing surfaces permitting negligible leakage therethrough. For high-speed shafts the packing type of seal is rendered inoperable if the axis of the shaft is not perfectly true and free from lateral vibration. Furthermore, mechanical type seals heretofore commonly used require special fastening means, such as set screws and the like, to affix the running part to the shaft and access to the interior of the seal in order to insure proper functioning and to make adjustments necessary to keep the seal in running order.

An object of the instant invention is to provide a mechanical type of seal which will operatively engage a shaft anywhere along its length without affixing means such as set screws, keyways and the like for fastening the running part of the seal to the shaft.

Another object is to provide a seal in which both the running and stationary parts are arranged to have freedom of movement whereby they are at all times kept in proper alignment with the rotating shaft and in proper engagement with each other regardless of vibrations produced by the rotating shaft or irregularities due to out-of-alignment conditions of the shaft axis.

Still another object is to provide a seal in which high-pressure intrusion fluid automatically increases the pressure and sealing efficiency between working surfaces of the seal so the pressure between the working surfaces is at all times greater than the pressure of an intruding fluid.

Another object is to provide a self-contained cartridge-type seal which lends itself to easy installation or application on any type or size of shaft and affords an effective seal therefor while necessitating a minimum amount of servicing.

Figure 1:
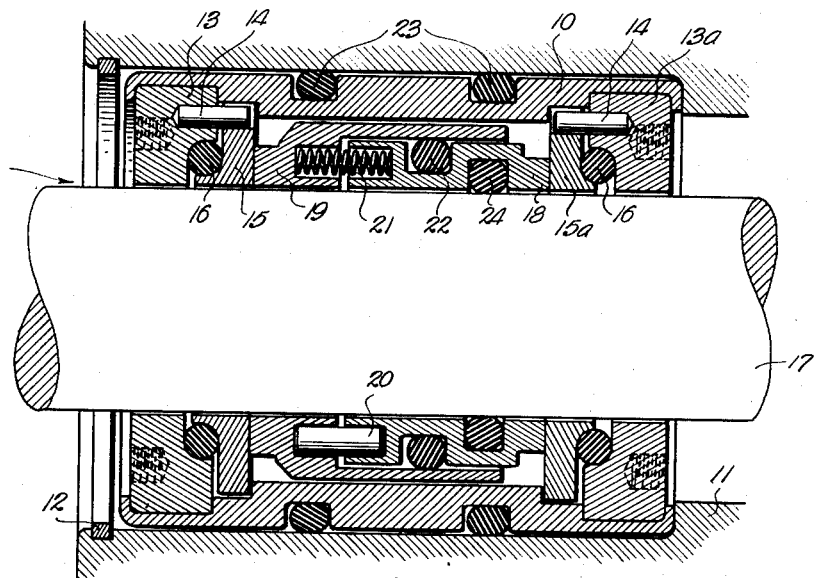
Figure 2:
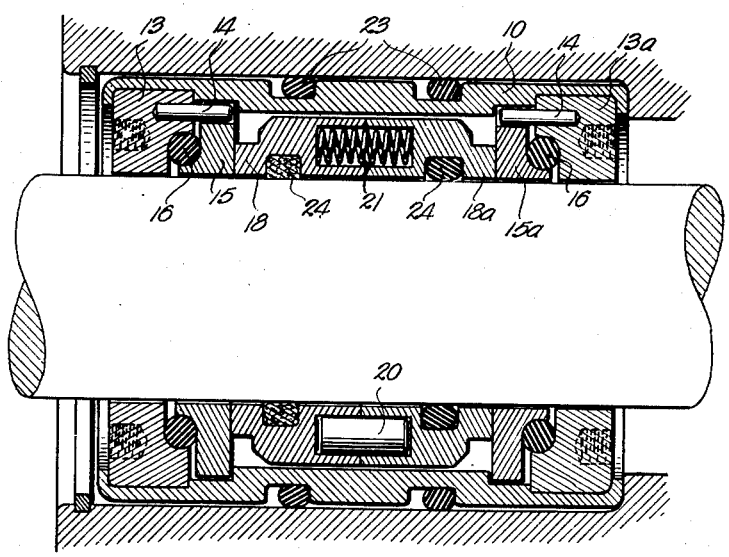

Other and further objects will appear from the description which follows:

In the accompanying drawings which form a part of the specification and are to be read in conjunction therewith and in which like reference numerals indicate like parts in the various views, Fig. 1 is a sectional view of a seal embodying the invention, and Fig. 2 is a sectional view of a modified type of seal also embodying the invention.

Referring to the drawings at 10 is shown the housing or cartridge held within the frame or support 11 by a ring 12. Enclosed within the cartridge 10 are end pieces 13 and 13a. In the sides of these end pieces are threaded holes into which may be screwed a threaded rod to facilitate their removal. Locating pins 14 fitting into apertures in the end pieces and into apertures in seal rings 15 and 15a cause the seal rings to remain stationary or move in unison with the end pieces. Between opposed curved surfaces of the end pieces and seal rings are held cushioning rings 16. Adjacent the outer rotating periphery of shaft 17 within the seal cartridge is a driving runner 18 partially surrounded and pinned to a bowl-shaped member 19 by pins 20. Between the runner and bowl are springs 21 which serve to press apart the runner and bowl and impose sealing pressure against the contact surfaces of the bowl 19 and seal ring 15 and the runner 18 and seal ring 15a.

Low-compression elastic rings 22 serve to seal the space between the runner and bowl without interfering with their axial movement produced by the action of springs 21.

Elastic rings 23 on the outside of the cartridge render it unnecessary to have a metal-to-metal press fit between the cartridge and housing to be protected. The end pieces 13 and 13a also act as bearings for the shaft 17 and align the cartridge 10 at all times concentric with the shaft. The elastic ring 24 beneath the driving member becomes tightly compressed in its groove when the cartridge is applied to the shaft or the shaft is threaded through the stationary cartridge. The groove within the driving runner which surrounds the ring 24 has a slight wave on its inner periphery, that is, the depth of the groove is not uniform but has alternate high and low points thus insuring a wave-like action of the seal for forces tangential to the shaft. The character and resiliency of ring 24 is such as to permit longitudinal movement of the runner 18 on the shaft under influence of springs 21.

Under the above circumstances the engagement of the driving runner 18 to rotating shaft 17 develops a torque many times that required to overcome friction of working surfaces of the runner and bowl against the seats or sealing rings 15 and 15a.

As one of the most difficult problems of an efficient and effective mechanical seal has been retention of an even and uniform contact between the running and stationary working surfaces of the seal, the flexibility of the parts and their self-aligning proclivities furnish these requirements. In conventional type seals, although the parts are perfectly made, angular vibrations of a high speed shaft or the slightest play which the shaft may have in its bearing or a slight bend in the shaft all tend to cause leakage due to uneven distribution of pressure along the circumference of the working surfaces.

This has been overcome by having all parts of the seal, both rotating and stationary, mounted in such fashion that there is the utmost of flexibility safeguarding the seal against improper alignment of parts under all conditions. It should be noted that the runner 18 has a small amount of clearance with the rotating shaft so it may tilt slightly in any direction to maintain a perfect seat or seal with the end piece 15a. Likewise the bowl portion 19 has clearance around the runner and about the periphery of the shaft which permits sufficient play in its axial movement to maintain proper sealing contact with the seal ring 15. The cartridge 10 has clearance in the bowl in which it is housed and may likewise move readily with the shaft if the shaft should develop irregularities in its rotation caused either by loose bearings or due to other causes. Besides this the seal rings or seats 15 and 15a are floatingly supported and floatingly centered by resilient cushioning rings 16 and 16a and can tilt with a certain degree of flexibility to accommodate irregularities in the shaft and at the same time maintain an even distribution of pressure along the working surfaces of the seal.

In the modification shown in Fig. 2 the construction is much the same except that for the runner and bowl members have been substituted adjoining runners designated as 18 and 18a and in place of the single resilient ring 24 between the runner in this modification two resilient rings are used, one beneath each portion of the runner. The modified type seal can be made of smaller outside diameter for smaller size shaft and, as suggested, is somewhat simpler in design. It lacks, however, the feature of the seal shown in Fig. 1, as pressure of an intruding fluid will not be as effectively sealed off as in the preferred form. In other words, an intruding fluid flowing into the seal from the direction indicated by the arrow in Fig. 1 increases the pressure between the sliding surfaces of parts 15 and 19 due to the piston action of the runner and bowl imposing pressure upon the compression spring 21 and restriction of the area between the runner and bowl members. While there is a certain amount of longitudinal resiliency afforded by the modified type of seal it is not as effective in excluding intruding fluids as is the mechanism shown in Fig. 1.

It will be seen that a seal of the cartridge type, such as that shown, wherein the sealing elements have free movement and are flexibly arranged to permit alignment with shaft variations, more effectively accomplishes its sealing function than a conventional type seal. In the latter the rotating seal member is fixedly attached to the shaft and more readily assumes the shaft irregularities.

From the foregoing it will be seen that the invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A seal device of the cartridge type for rotating shafts comprising an enclosure mounted in a support, a rotating shaft extending through the enclosure, flexible rings surrounding the enclosure and providing a resilient mounting for the enclosure in the support, end pieces and seal rings flexibly joined and positioned within opposite ends of the enclosure, members adjacent to and rotatable with the shaft intermediate the seal rings and expandable longitudinally within the enclosure, the end surfaces of said members having sealing contact with the seal rings, and fluid tight resilient cushioning rings between the end pieces and seal rings and between the respective members rotatable with the shaft and between the shaft and one of the rotatable members.

2. A seal device as in claim 1 in which compression springs positioned between the members rotatable with the shaft render them expandable longitudinally of the shaft and impose pressures upon the sealing surfaces between said members and seal rings.

3. A seal device as in claim 1 in which the respective members adjacent the resilient cushioning rings are contoured to receive and hold said rings in position.

4. A seal device as in claim 1 in which loosely fitting pins constitute the flexible joints between the end pieces and seal rings and the members rotatable with the shaft.

5. A seal device for a rotating shaft, comprising a stationary housing having annular end walls encircling the shaft at axially spaced-apart points, a pair of seal rings encircling the shaft between said end walls, a pair of telescoping sleeves encircling the shaft between said seal rings, compressed spring means between said sleeves urging them axially apart so the ends thereof abut said seal rings and urge said rings toward said end walls, a fluid-tight resilient cushioning ring between the outside of the inner telescoping sleeve and the inside of the outer telescoping sleeve, a fluid-tight resilient cushioning ring between the shaft and the inside of one of said sleeves, and a fluid-tight cushioning ring between each seal ring and its adjacent end wall.

ARMAIS ARUTUNOFF.

REFERENCES CITED

The following references are of record in the file of this patent:

UNITED STATES PATENTS

| Number | Name | Date |
|---|---|---|
| 1,862,887 | Durdin | June 14, 1932 |
| 2,366,629 | Kohler | Jan. 2, 1945 |
| 2,393,779 | Hunter | Jan. 29, 1946 |
| 2,411,509 | Endebak | Nov. 26, 1946 |

FOREIGN PATENTS

| Number | Country | Date |
|---|---|---|
| 348,374 | Great Britain | 1931 |